US010302945B2

(12) United States Patent
Raffle et al.

(10) Patent No.: US 10,302,945 B2
(45) Date of Patent: May 28, 2019

(54) NEAR-EYE DISPLAY WITH STACKED LIGHTGUIDES

(71) Applicant: Google Inc., Mountain View, CA (US)

(72) Inventors: Hayes S. Raffle, Palo Alto, CA (US); Ozan Cakmakci, Sunnyvale, CA (US); Oscar A. Martinez, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 14/824,445

(22) Filed: Aug. 12, 2015

(65) Prior Publication Data

US 2017/0045741 A1 Feb. 16, 2017

(51) Int. Cl.
*G02B 25/00* (2006.01)
*G02B 27/01* (2006.01)
*G02B 5/08* (2006.01)

(52) U.S. Cl.
CPC ....... *G02B 27/0172* (2013.01); *G02B 5/0808* (2013.01); *G02B 25/001* (2013.01); *G02B 2027/0138* (2013.01); *G02B 2027/0178* (2013.01)

(58) Field of Classification Search
CPC ............ G02B 27/0172; G02B 27/0149; G02B 27/145; G02B 27/143; G02B 27/0025; G02B 27/144; G02B 27/013; G02B 23/02; G02B 23/18; G02B 5/045; G02B 27/0103; G02B 17/08
USPC ....... 359/630–639, 404, 407, 409, 410, 618, 359/619, 625, 13–14, 727, 732
See application file for complete search history.

(56) References Cited

U.S. PATENT DOCUMENTS

| | | | |
|---|---|---|---|
| 7,672,055 | B2 | 3/2010 | Amitai |
| 7,724,443 | B2 | 5/2010 | Amitai |
| 8,384,999 | B1 | 2/2013 | Crosby et al. |
| 8,665,178 | B1 | 3/2014 | Wang |
| 9,720,232 | B2 | 8/2017 | Hua et al. |

(Continued)

FOREIGN PATENT DOCUMENTS

| | | |
|---|---|---|
| TW | 201502580 A | 1/2015 |
| WO | WO 2013/049012 A1 | 4/2013 |

OTHER PUBLICATIONS

PCT/US2016/041186; PCT International Search Report and Written Opinion dated Sep. 19, 2016, 11 pages.

(Continued)

*Primary Examiner* — Stephone B Allen
*Assistant Examiner* — Rahman Abdur

(57) ABSTRACT

Embodiments are described of an apparatus including an eyepiece having a front surface, a back surface spaced apart from the front surface, and an edge forming a perimeter of the eyepiece. The eyepiece includes an angled surface to direct light eye-measurement light reflected from an eye into the eyepiece and to direct display light out of the eyepiece to the eye. A first waveguide is formed in the eyepiece and extending from the angled surface to the edge, the first waveguide being optically coupled to a first portion of the angled surface having a first surface treatment. And a second waveguide is formed in the eyepiece and extending from the angled surface to the edge, the second waveguide being optically coupled to a second portion of the angled surface having a second surface treatment.

17 Claims, 6 Drawing Sheets

SCENE 99

200 202 201 210 205 208 207 216 205 205 204 203 216 206 212 214 218 10 z x

(56) References Cited

U.S. PATENT DOCUMENTS

| | | | | |
|---|---|---|---|---|
| 2012/0062998 | A1* | 3/2012 | Schultz | B29D 11/00663 359/630 |
| 2013/0129282 | A1 | 5/2013 | Li | |
| 2013/0207887 | A1* | 8/2013 | Raffle | G02B 27/00 345/156 |
| 2013/0257832 | A1 | 10/2013 | Hammond | |
| 2013/0293577 | A1 | 11/2013 | Perez et al. | |
| 2013/0322810 | A1* | 12/2013 | Robbins | G02B 5/30 385/11 |
| 2015/0138451 | A1 | 5/2015 | Amitai | |
| 2015/0212327 | A1* | 7/2015 | Osterhout | G06F 5/10 359/630 |

OTHER PUBLICATIONS

Taiwan Office Action for Taiwan Patent Application No. 105124214 dated Apr. 25, 2017 with English Translation, 7 pages.

International Report on Patenetability dated Feb. 22, 2018 for PCT Application No. PCT/US2016/041186, 8 pages.

Office Action dated Apr. 19, 2018 for TW Application No. 10720341260, 16 pages.

Japanese Office Action dated Nov. 27, 2018 for corresponding JP Application No. 2017-557090, 5 pages. Includes English Translation.

European Office Action dated Dec. 19, 2018 for corresponding EP Application No. 16738996.4, 4 pages.

German Office Action dated Feb. 1, 2019 for corresponding DE Application No. 11 2016 001 900.9; 14 pages, including English translation.

* cited by examiner

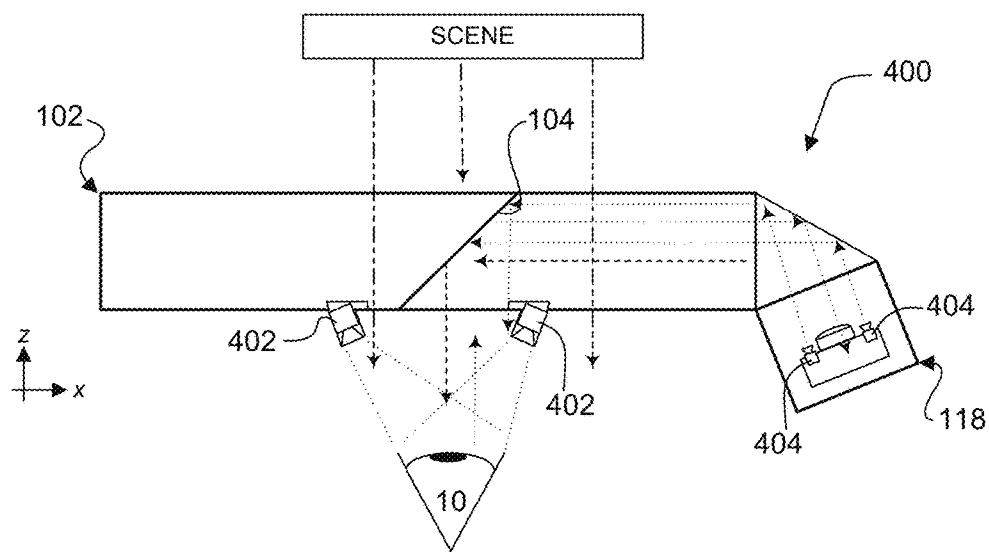
*Fig. 4*
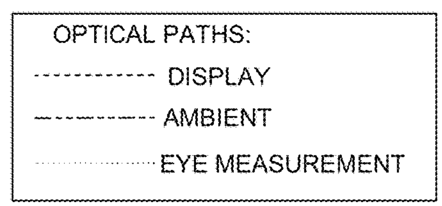

NEAR-EYE DISPLAY WITH STACKED LIGHTGUIDES

TECHNICAL FIELD

The disclosed embodiments relate generally to near-eye displays and in particular, but not exclusively, to near-eye displays with stacked waveguides.

BACKGROUND

Heads-up displays (also known as head-mounted displays or HMDs) allow a user to view a scene while relevant information is overlaid on the scene, so that the user looking through the heads-up display simultaneously sees the scene and the relevant information. For instance, a pilot looking through a heads-up display while landing an airplane simultaneously sees the airport ahead (the scene) through the heads-up display while the heads-up display projects information such as speed, heading and altitude (the relevant information) that the pilot needs to land the plane.

In some uses of a heads-up display it can be useful to know what part of the scene the user is viewing. One way to accomplish this is through eye-measurement technology, but existing eye-measurement technologies have some disadvantages. Some existing eye measurement technologies use separate optical paths for eye measurement and display but make the heads-up display more bulky and complex and less streamlined.

Some HMDs include compact near-eye displays positioned in front of, and close to, the user's eye. Enabling eye measurement in an HMD with a near-eye display when the camera and display are off-axis while solving both ergonomic fitting and algorithm complexity is difficult. On-axis approaches have been developed—using the same light guide for both a display and eye sensor, for instance—but not all display designs support this approach. The problem is considerably simpler when the display and eye sensor are arrange in a nearly co-axial configuration because the problem resolves to a two-dimensional solution.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 4 is a top view of another embodiment of a near-eye display.

DETAILED DESCRIPTION OF THE ILLUSTRATED EMBODIMENTS

Embodiments are described of an apparatus, system and method for near-eye displays with stacked waveguides.

Specific details are described to provide an understanding of the embodiments, but one skilled in the relevant art will recognize that the invention can be practiced without one or more of the described details or with other methods, components, materials, etc. In some instances well-known structures, materials, or operations are not shown or described in detail but are nonetheless encompassed within the scope of the invention.

Reference throughout this specification to "one embodiment" or "an embodiment" means that a described feature, structure, or characteristic can be included in at least one described embodiment, so that "in one embodiment" or "in an embodiment" do not necessarily refer to the same embodiment. Furthermore, the described features, structures, or characteristics can be combined in any suitable manner in one or more embodiments.

Figure 1A:
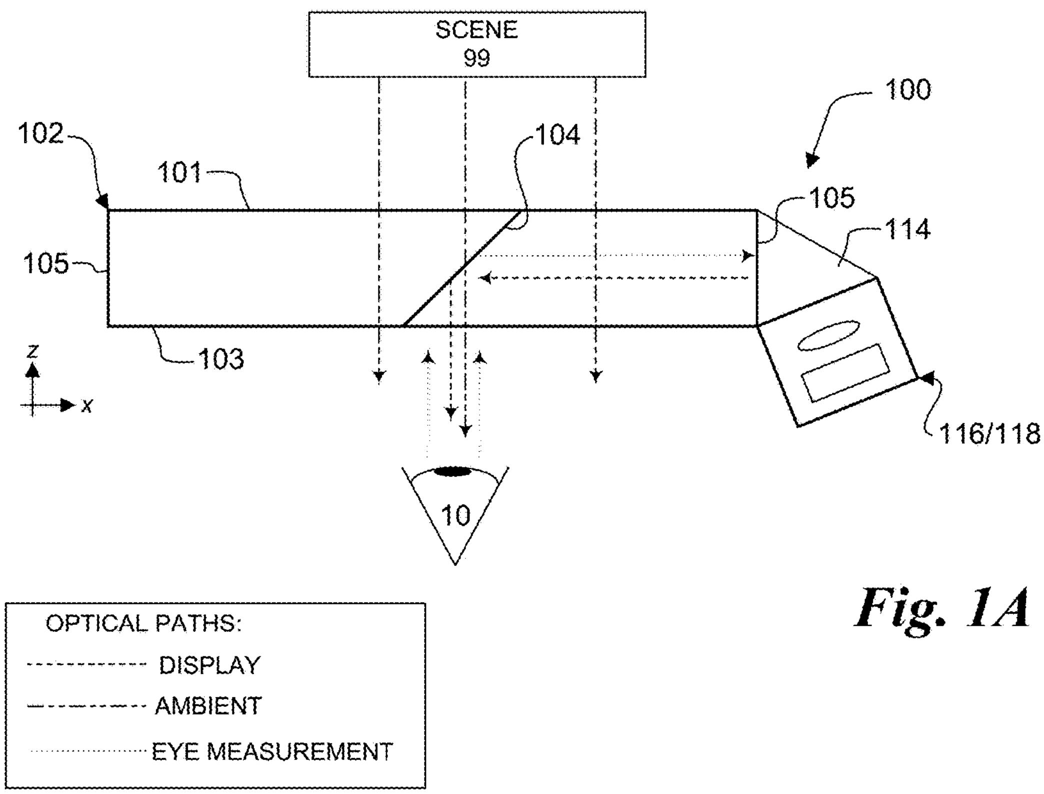
FIGS. 1A-1B are a top view and a front view, respectively, of an embodiment of a near-eye display.
Figure 1B:
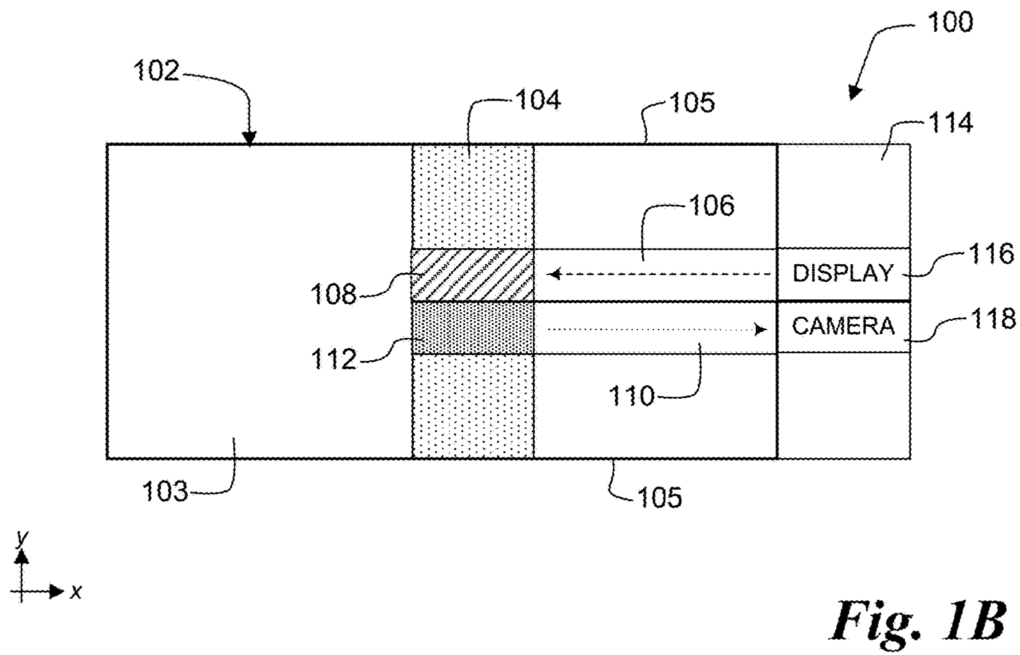

FIGS. 1A-1B together illustrate an embodiment of a near-eye display 100; FIG. 1A is a top view (in the x-z plane), FIG. 1B a side view (in the x-y plane, as seen by user's eye 10). Display 100 includes an eyepiece 102 with a front surface 101, a back surface 103, and an edge 105 around the perimeter of the eyepiece. Eyepiece 102 can be made of any kind of material that is substantially transparent in the wavelengths of interest; in one embodiment, for instance, eyepiece 102 can be made of a plastic material such as polycarbonate or optical-grade acrylic, but in other embodiments it could be made of a different material such as glass. In the illustrated embodiment front surface 101 and back surface 102 are planar, making eyepiece 102 substantially flat, but in other embodiments front surface 101 and back surface 103 can be curved, leading to an eyepiece 102 that is also curved (see, e.g., FIG. 3).

An angled surface 104 is laterally positioned (i.e., in the x direction) in a part of eyepiece 102 that substantially aligns with eye 10 (substantially in the middle of the eyepiece in the illustrated embodiment). Angled surface 104 is oriented to direct display light traveling from display 116 through eyepiece 102 to user's eye 10, and to direct eye-measurement radiation reflected by eye 10 through eyepiece 102 to camera 118. In the illustrated embodiment angled surface 104 extends through substantially the entire depth of eyepiece 102 from front to back (i.e., in the Z direction) and extends substantially the entire height of eyepiece 102 from top to bottom (i.e., in the y direction). But in other embodiments angled surface 104 need not extend through the full depth or height of eyepiece 102.

Angled surface 104 includes a first portion 108 that has a first surface treatment and a second portion 112 that has a second surface treatment. In the illustrated embodiment, first portion 108 and second portion 112 abut each other, but in other embodiments they need not abut. Moreover, in the illustrated embodiment first portion 108 is above second portion 112, but in other embodiments their positions can be reversed (see, e.g., FIGS. 1C-1D). In one embodiment, the first surface treatment makes first portion 108 a 50/50 (50% pass, 50% reflect) mirror and the second surface treatment is a coating that makes second portion 112 substantially reflect non-visible eye-measurement radiation, such as infrared, while allowing visible wavelengths of light to pass through. Other embodiments can of course use other first and second surface treatments for first portion 108 and second portion 112.

First waveguide 106 and second waveguide 110 are formed in eyepiece 102 as a result of the different surface treatments applied to the first portion 108 of angled surface 104 and second portion 112 of angled surface 104. First waveguide 106 extends substantially from display 116 through optical coupler 114 and eyepiece 102 to first portion 108 of angled surface 104. Second waveguide 110 extends substantially from second portion 112 of angled surface 104 through eyepiece 102 and optical coupler 114 to camera 118. The height (i.e., the extent in the y direction) and the depth (i.e., the extent in the Z direction) of first waveguide 106 and second waveguide 110 will generally be related to the height and depth of first portion 108 and second portion 112 of angled surface 104. In the illustrated embodiment first waveguide 106 and second waveguide 110 are shown as separate waveguides within eyepiece 102, but in other embodiments there need be no physical or optical separation between waveguides 106 and 110.

An optical coupler 114 is positioned along edge 105 so that display 116 and camera 118 can be optically coupled to eyepiece 102. More specifically, optical coupler 114 couples display 116 to first waveguide 106 and also couples an eye-measurement camera 118 to second waveguide 110. In the illustrated embodiment optical coupler 114 is a prism or prismatic element, but in other embodiments other types of optical coupler can be used. And in the illustrated embodiment optical coupler 114 is a single piece that couples both display 116 and camera 118 to eyepiece 102, but in other embodiments there can be multiple optical couplers such that display 116 and camera 118 are coupled to eyepiece 102 by separate optical couplers. Also in the illustrated embodiment optical coupler 114 is attached to eyepiece 102, for instance by using an optically transparent adhesive, but in other embodiments optical coupler 114 can be integrally formed with eyepiece 102.

A display 116 and a camera 118 are optically coupled to eyepiece 102 via optical coupler 114. Display 116 is optically coupled to first waveguide 106 so that display light from display 116 is input into first waveguide 106. In one embodiment display 118 is a liquid-crystal-on-silicon (LCOS) display, but in other embodiments other kinds of displays can be used. Display 116 can also include additional optics to condition (i.e., focus or collimate) display light emitted by display 116 before the display light is launched into first waveguide 106.

Eye-measurement camera 118 is optically coupled to second waveguide 110 to receive eye-measurement radiation that is reflected from eye 10 and coupled into second wave guide 110 by second portion 112 of angled surface 104. In one embodiment camera 118 can be a camera including image-forming optics, an image sensor such as a CMOS or CCD image sensor (see FIG. 4), and additional elements such as processing circuitry and logic to process images captured by the camera. The eye-measurement radiation can have a wavelength within the visible range or outside the visible range, but will generally be of a wavelength different than the wavelength output by display 116. In one embodiment the eye-measurement radiation can be infrared.

In operation of near-eye display 100 three optical paths can operate simultaneously in the display: a display light path, an eye-measurement radiation path, and an ambient light path. The display light path begins at display 116, which generates display light that enters first waveguide 106 and travels through the waveguide by a mechanism such as total internal reflection to first portion 108 of angled surface 104. In an embodiment where because of its surface treatment first portion 108 is a 50/50 mirror, 50% of the display light will pass through the mirror but 50% will be turned so that it exits eyepiece 102 and is directed into user's eye 10.

The second optical path is the path of the eye-measurement radiation. Eye-measurement radiation is reflected by user's eye 10 toward the second portion 112 of angled surface 104. The eye-measurement radiation reflected by eye 10 can originate from the ambient light or can originate from one or more eye-measurement radiation sources that emit light at the eye-measurement wavelength and are positioned to direct eye-measurement radiation toward eye 10 (see, e.g., FIG. 4). Eye-measurement radiation from eye 10 that is incident on second portion 112 is reflected by the second portion into second waveguide 110, through which the eye-measurement radiation travels to camera 118. Eye-measurement camera 118 can then use the received eye-measurement radiation to image user's eye 10 and measure its characteristics.

The third optical path is the ambient light path. In an embodiment in which first portion 108 is a 50/50 mirror and second portion 102 is an infrared-reflecting surface that allows visible light to pass, at least part of the visible portion of ambient light from scene 99 will pass through both first portion 108 and second portion 112 and through eyepiece 102 to user's eye 10, so that the user simultaneously sees scene 99 and the information from display 116.

Figure 1C:
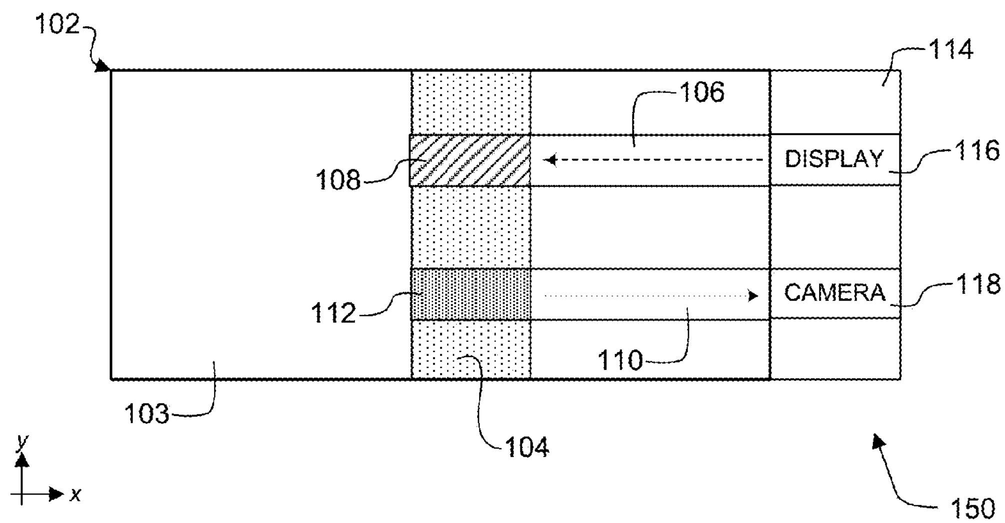
FIGS. 1C-1D are front views of alternative embodiments of a near-eye display.

FIG. 1C illustrates another embodiment of a heads-up display 150. Display 150 is similar in construction to display 100. The primary difference between displays 100 and 150 is that display 150 has first portion 108 and second portion 112, and hence first waveguide 106 and second waveguide 110, vertically separated from each other instead of abutting as in display 100. The three optical paths in display 150 are similar to those in display 100.

Figure 1D:
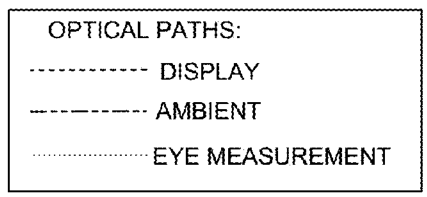
Figure 1D:
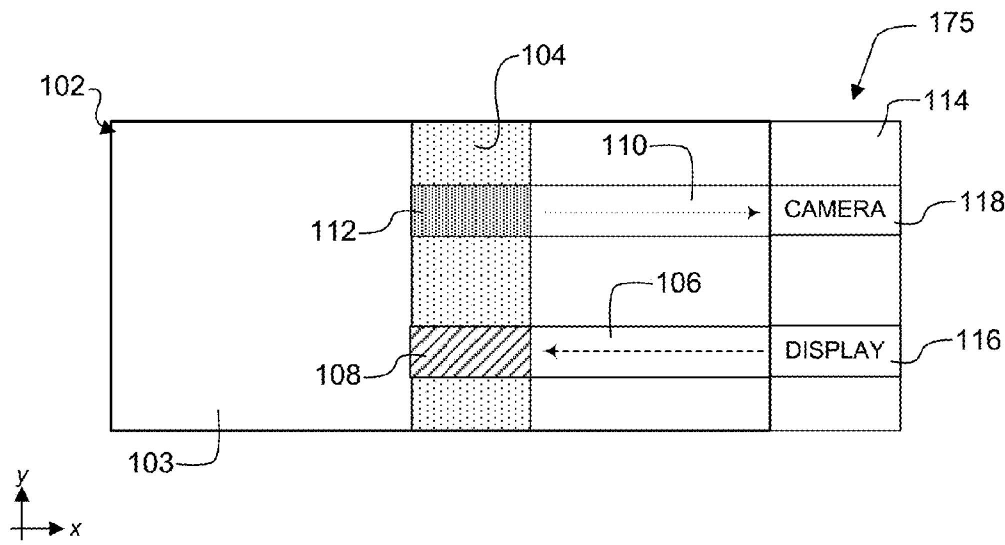

FIG. 1D illustrates another embodiment of a heads-up display 175. Display 175 is similar in construction to display 150; the primary difference is in the positioning of the waveguides. In display 175 the positions of first waveguide 106 and second waveguide 110 are reversed, so that second waveguide 110 is above first waveguide 106 instead of below. Display 175 operates similarly to display 100, with three simultaneously-operating optical paths: the display light path, the eye-measurement radiation path, and the ambient light path.

Figure 2A:
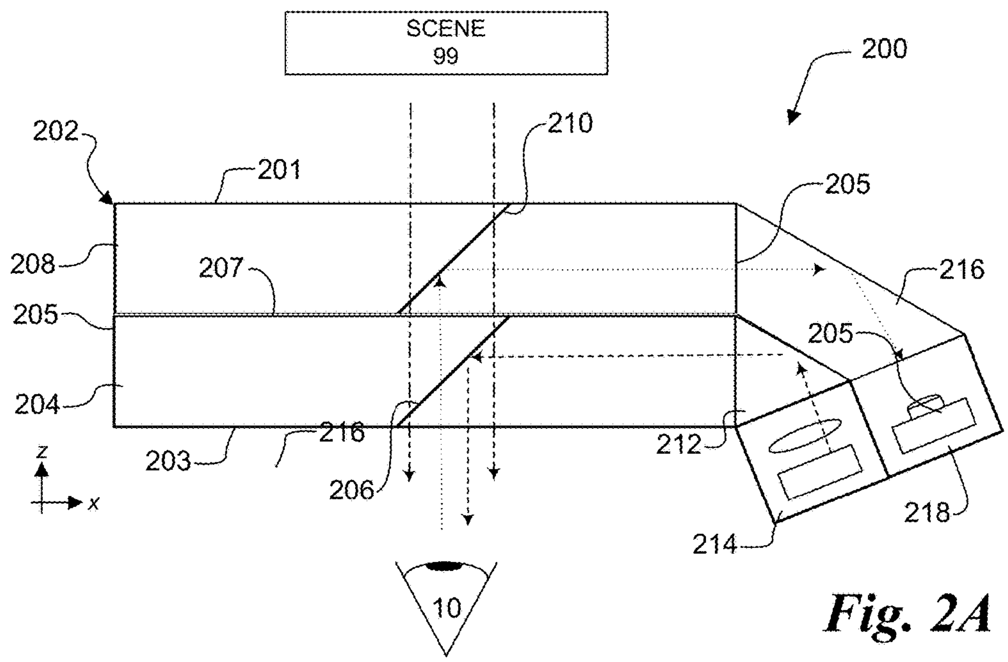
FIGS. 2A-2B are top views of alternative embodiments of a near-eye display.

FIG. 2A illustrates a near-eye display 200 similar in many respects to display 100. The primary difference between displays 100 and 200 is that in display 200 the waveguides are stacked differently.

Display 200 includes an eyepiece 202 that has a front surface 201, a back surface 203, and an edge 205 around the perimeter of the eyepiece. Eyepiece 202 includes a first waveguide 204 and a second waveguide 208 that are stacked in the Z direction, instead of the y direction as in display 100, meaning that one is stacked in front of the other instead of one above the other. In the illustrated embodiment second waveguide 208 is stacked in front of first waveguide 204, but in other embodiments their positions can be reversed. And in the illustrated embodiment the first and second waveguides make up the full thickness of eyepiece 202—that is, first waveguide 204 forms back surface 203 and second waveguide 208 forms front surface 201—but in other embodiments, first and second waveguides 204 and 208 can be stacked as shown while still being embedded within eyepiece 202 such that they do not form the front and back surfaces of the eyepiece. In the illustrated embodiment eyepiece 202 is substantially flat, but as with display 100 in other embodiments front surface 201 and back surface 203 can be curved, leading to an eyepiece 202 that is also curved (see, e.g., FIG. 3).

First waveguide 204 and second waveguide 208 can be made of any kind of material that is substantially transparent in the wavelengths of interest; in one embodiment, for example, waveguides 204 and 206 can be made of a plastic material such as polycarbonate or optical-grade acrylic, but in other embodiments it could be made of a different material such as glass. In some embodiments first waveguide 204 and second waveguide 208 can both be made of materials with the same refractive index, but in other embodiments first waveguide 204 and second waveguide 208 need not have the same refractive index. In embodiments where first waveguide 204 and second waveguide 208 have similar refractive indices, they can be bonded together along interface 207 with a low-index optical adhesive so that total internal reflection can happen separately within each waveguide.

A first angled surface 206 is laterally positioned (i.e., in the x direction) in a part of eyepiece 202 that substantially aligns with eye 10 (substantially in the middle of the eyepiece in the illustrated embodiment). Angled surface 206 is oriented to direct display light traveling from display 214 through waveguide 204 toward eye 10. In one embodiment angled surface 206 can extend through substantially the entire depth of waveguide 204 from front to back (i.e., in the Z direction) and substantially through the entire height of waveguide 204 from top to bottom (i.e., in the y direction). But in other embodiments angled surface 206 need not extend through the full depth or height of waveguide 204. At least a portion of angled surface 206 has a first surface treatment that makes the portion of angled surface 206 partially reflective. For instance, in one embodiment the first surface treatment can make the first portion of angled surface 206 a 50/50 (50% pass, 50% reflect) mirror, but other embodiments can of course use other first surface treatments.

A second angled surface 210 is laterally positioned (i.e., in the x direction) in a part of eyepiece 202 that substantially aligns with eye 10 (substantially in the middle of the eyepiece in the illustrated embodiment). Second angled surface 210 is oriented to receive incident eye-measurement radiation reflected by eye 10 and direct it into waveguide 208 so that it travels to camera 218. In one embodiment angled surface 210 can extend through substantially the entire depth of waveguide 208 from front to back (i.e., in the Z direction) and can extend substantially through entire height of waveguide 208 from top to bottom (i.e., in the y direction). But in other embodiments angled surface 210 need not extend through the full depth or height of waveguide 208. At least a portion of angled surface 210 has a second surface treatment that makes the treated portion of angled surface 210 at least partially reflective to eye-measurement radiation. In one embodiment the second surface treatment can be a coating that substantially reflects non-visible eye-measurement radiation such as infrared while allowing visible wavelengths of light to pass through. Other embodiments can of course use other second surface treatments.

As in display 100, in display 200 three optical paths can operate simultaneously: a display light path, an eye-measurement radiation path, and an ambient light path. The display light path begins at display 214, which generates display light that enters first waveguide 204 and travels through the waveguide by a mechanism such as total internal reflection to the treated portion of angled surface 206. In an embodiment where because of its surface treatment first portion 108 is a 50/50 mirror, 50% of the display light will pass through the mirror but 50% will be turned so that it exits eyepiece 202 and is directed into user's eye 10.

The second optical path is the path of the eye-measurement radiation. Eye-measurement radiation is reflected by user's eye 10 toward first angled surface 206 which, because it is a 50/50 mirror, transmits half the radiation on to second angled surface 210. Eye-measurement radiation incident on the treated portion of second angled surface 210 is reflected into second waveguide 208, through which the eye-measurement radiation travels to camera 218. Eye-measurement camera 218 can then use the received eye-measurement radiation to image user's eye 10 and measure its characteristics.

The third optical path is the ambient light path. In an embodiment in which at least a portion of first angled surface 206 is a 50/50 mirror and at least a portion of second angled surface 210 is an infrared-reflecting surface that allows visible light to pass, at least part of the visible portion of ambient light from scene 99 will pass through both first angled surface 206 and second angled surface 210 and through eyepiece 102 to user's eye 10, so that the user simultaneously sees scene 99 and the information from display 214.

Figure 2B:
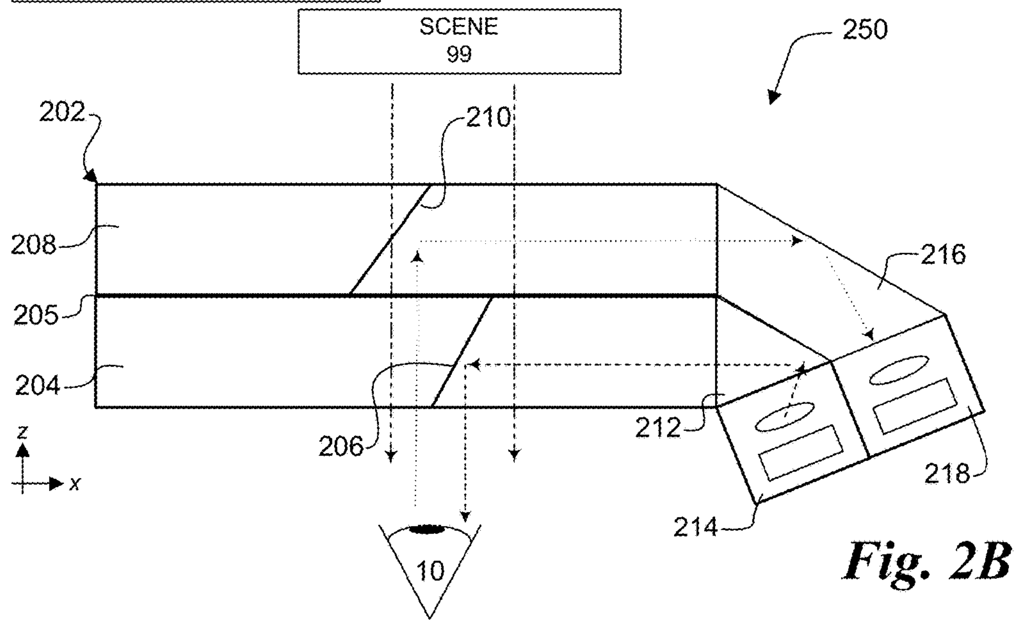

FIG. 2B illustrates a near-eye display 250 similar in many respects to display 200. The primary difference between displays 200 and 250 is that angled surfaces are positioned differently. In display 250, first angled surface 206 and second angled surface are laterally offset (i.e., offset in the x-direction) but still within the field of view of eye 10. The three optical paths in display 250 are similar to those in display 200, except that the ambient optical path and the eye-measurement optical path need not pass through both angled surfaces.

Figure 3:
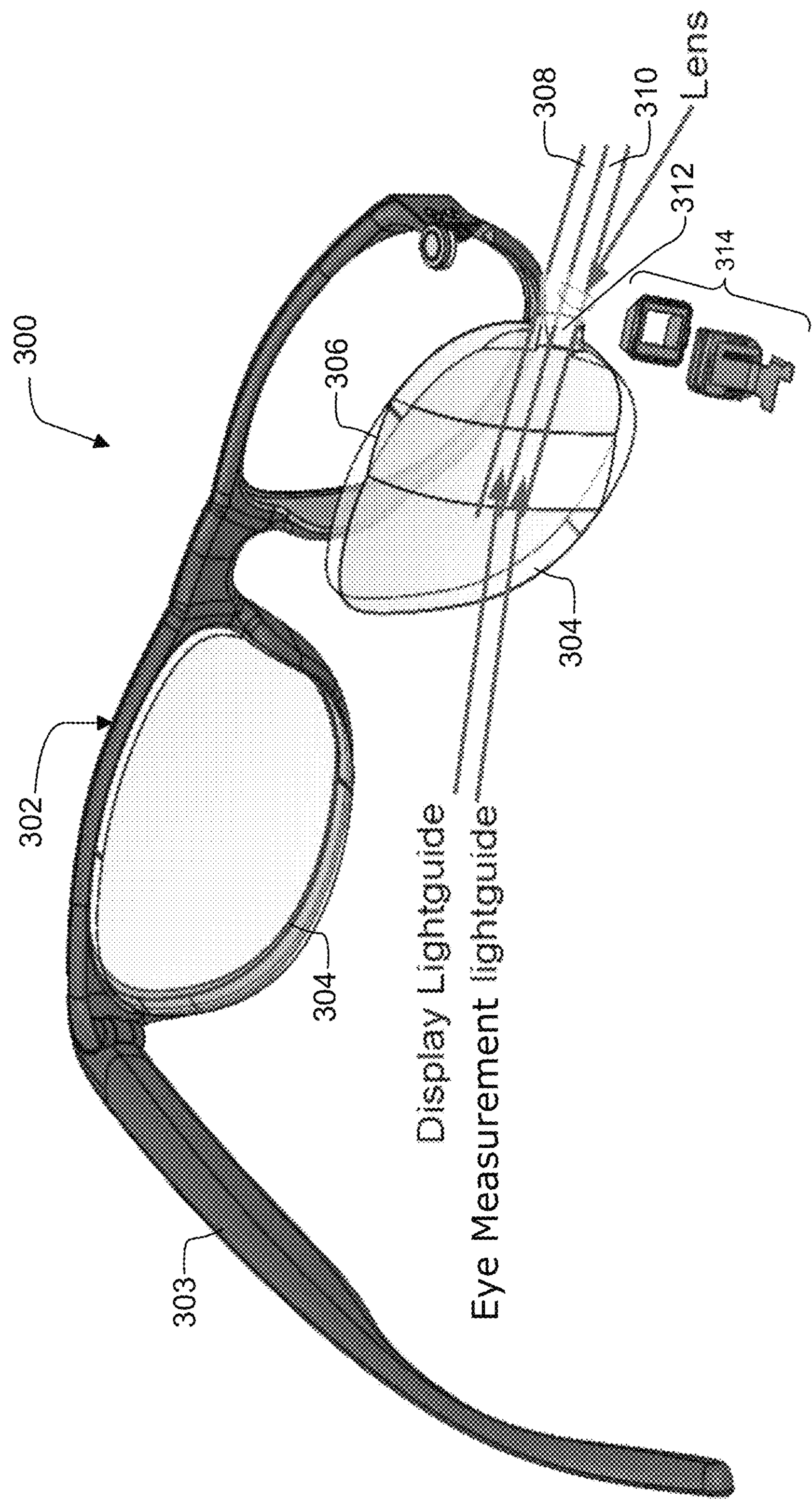
FIG. 3 is a perspective view of an embodiment of a head-mounted display including embodiments of the described near-eye displays.

FIG. 3 illustrates an embodiment of a heads-up display 300 implemented as a pair of eyeglasses. Heads-up display 300 includes a pair of eyepieces 304, at least one of which can be a near-eye display such as near-eye displays 100, 150, 175, 200, or 250. In the illustrated embodiment lens 304 includes first waveguide 308 and second waveguide 310. An optical coupler 312 is positioned on an edge of lens 304 and a display/camera assembly 314 is optically coupled to the lens 304—and hence to first waveguide 308 and second waveguide 310—by the optical coupler.

Eyepieces 304 are mounted to a frame 302, which includes a left ear arm 304 and a right ear arm (not shown) to keep display 300 positioned on a user's head with eyepieces 304 properly positioned in front of the user's eyes. Although the figure illustrates a binocular embodiment (two eyepieces), heads-up display 300 can also be implemented as a monocular (one eyepiece) embodiment. Of course, other frame assemblies having other shapes may be used (e.g., a visor with ear arms and a nose bridge support, a single contiguous headset member, a headband, or goggles type eyewear, etc.).

FIG. 4 illustrates another embodiment of a near-eye display 400. In some embodiments the eye-measurement radiation can come from ambient light originating from the scene or from the surrounding region, but in other embodiments it may be necessary to provide illumination that emits radiation at the eye-measurement wavelength. Display 400 includes a pair of eye-measurement radiation sources 402 positioned about angled surface 104. Eye measurement radiation sources 402 emit radiation at the eye-measurement wavelength and are positioned and oriented to direct their eye-measurement radiation toward user's eye 10 so that at least some of the eye-measurement radiation reflected from eye 10 will be directed toward angled surface 104. In an eyeglass embodiment such as the one shown in FIG. 3, for instance, sources 402 can be positioned somewhere on the frame. In one embodiment sources 402 are infrared LEDs, so that the eye measurement light has a wavelength in the infrared range. But in other embodiments sources 402 can be different radiation sources emitting a different wavelength or wavelength range. Generally it can be desirable that sources 402 emit a broad beam of radiation that substantially illuminates the eye 10.

In addition to or instead of sources 402, display 400 can include eye-measurement radiation sources 404 positioned on or near camera 118. In the illustrated embodiment, eye-measurement radiation sources 404 are positioned on either side of the imaging optics associated with camera 118, so that eye measurement radiation travels through second waveguide 110 in eyepiece 102 (see FIG. 1B) and is reflected from second portion 112 into eye 10. Eye 10 then reflects the eye-measurement radiation back into eyepiece 102, where it is reflected by second portion 112 into second waveguide 110 and to camera 118. Although the illustrated embodiment shows two radiation sources 404, other embodiments can include more or less radiation sources. In still other embodiments eye-measurement radiation sources 404 can be positioned differently than shown.

Figure 5:
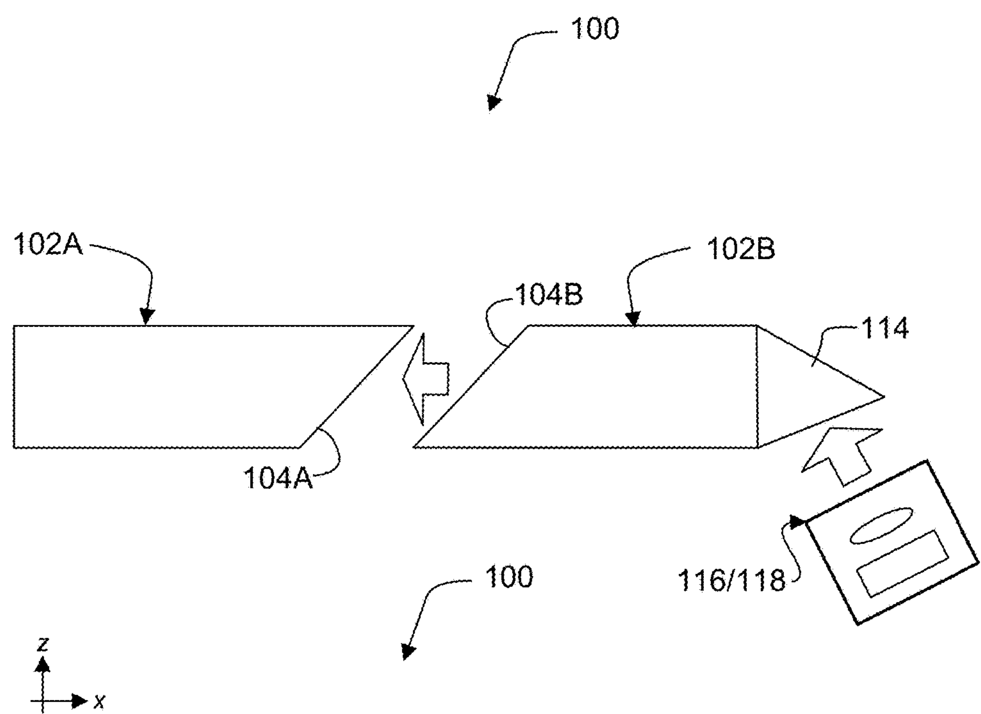
FIG. 5 illustrates an embodiment of a process for making a near-eye display such as the one shown in FIGS. 1A-1B.

FIG. 5 illustrates an embodiment of a process for making near-eye display 100, although the illustrated process can also be used for making the other disclosed displays. A first half 102A and a second half 102B of eyepiece 102 are first formed of the desired material. First half 102A includes a first angled surface 104A and second half 102B includes a second angled surface 104B. The first and second surface treatments are applied to the portions of first angled surface 104A, second angled surface 104B, or both, and then first half 102A and second half 102B are put together such that angled surfaces 104A and 104B mate with each other and are bonded, for instances with an optically transparent adhesive, to form angled surface 104. After eyepiece 102 is formed by joining halves 102A and 102B, optical coupler 114 is attached to an edge of the eyepiece using an optically transparent adhesive. And after optical coupler 114 is joined to eyepiece 102, display 116 and camera 114 are joined to optical coupler 114 using optically transparent adhesive or using other fastening means. In other embodiments, display 100 can of course be constructed by a different process than shown.

The above description of embodiments, including what is described in the abstract, is not intended to be exhaustive or to limit the invention to the described forms. Specific embodiments of, and examples for, the invention are described herein for illustrative purposes, but various equivalent modifications are possible within the scope of the invention in light of the above detailed description, as those skilled in the relevant art will recognize.

The terms used in the following claims should not be interpreted to limit the invention to the specific embodiments disclosed in the specification and the claims. Rather, the scope of the invention is to be determined entirely by the following claims, which are to be interpreted using established claim interpretation doctrines.

The invention claimed is:

1. An apparatus comprising:

an eyepiece having a front surface, a back surface spaced apart from the front surface and extending in a first direction and a second direction orthogonal to the first direction, and an edge forming a perimeter of the eyepiece, the eyepiece having therein a single angled surface to direct eye-measurement light reflected from an eye into the eyepiece and to direct display light out of the eyepiece to the eye;

a first waveguide formed in the eyepiece and extending in the first direction from the single angled surface to the edge, the first waveguide being optically coupled to a first portion of the single angled surface having a first surface treatment;

a second waveguide formed in the eyepiece and extending in the first direction from the single angled surface to the edge, the second waveguide being optically coupled to a second portion of the single angled surface having a second surface treatment, wherein the second surface treatment is different than the first surface treatment;

a display positioned at the edge and optically coupled to the first waveguide, wherein the display is configured to launch the display light into the first waveguide; and a camera positioned at the edge and optically coupled to the second waveguide, wherein the camera is configured to capture eye-measurement light from the second waveguide concurrently with the display light being launched into the first waveguide;

wherein the first portion of the single angled surface and is offset in the second direction from the second portion of the single angled surface; and wherein the single angled surface is configured to concurrently direct eye-measurement light into the eyepiece and direct display light out of the eyepiece.

2. The apparatus of claim 1 wherein the first surface treatment makes the first portion of the angled surface a 50/50 mirror.

3. The apparatus of claim 1 wherein the second surface treatment makes the second portion of the angled surface an infrared reflector that reflects infrared radiation light but is at least partially transparent to visible wavelengths of light.

4. The apparatus of claim 1 wherein the display and the camera are optically coupled to the edge by an optical coupler.

5. The apparatus of claim 1 wherein the first and second portions do not abut in the second direction.

6. The apparatus of claim 5 wherein the first and second portions abut in the second direction.

7. A system comprising:

a frame to hold one or more near-eye displays in front of a user's eye, wherein at least one of the one or more near-eye displays comprises:

an eyepiece having a front surface, a back surface spaced apart from the front surface and extending in a first direction and a second direction orthogonal to the first direction, and an edge forming a perimeter of the eyepiece, the eyepiece having therein a single angled surface to direct eye-measurement light reflected from an eye into the eyepiece and to direct display light out of the eyepiece to the eye;

a first waveguide formed in the eyepiece and extending in the first direction from the single angled surface to the edge, the first waveguide being optically coupled to a first portion of the single angled surface having a first surface treatment; and a second waveguide formed in the eyepiece and extending in the first direction from the single angled surface to the edge, the second waveguide being optically coupled to a second portion of the single angled surface having a second surface treatment, wherein the second surface treatment being is different than the first surface treatment, wherein the first portion of the single angled surface is offset from the second portion of the single angled surface in the second direction, and wherein the single angled surface is configured to concurrently direct eye measurement light into the eyepiece and direct display light out of the eyepiece;

a display positioned at the edge and optically coupled to the first waveguide, wherein the display is configured to launch the display light into the first waveguide; and a camera positioned at the edge and optically coupled to the second waveguide, wherein the camera is configured to capture eye-measurement light from the second waveguide concurrent with the display light being launched into the second waveguide.

8. The system of claim 7 wherein the first surface treatment makes the first portion of the angled surface a 50/50 mirror.

9. The system of claim 7 wherein the second surface treatment makes the second portion of the angled surface an infrared reflector that reflects infrared light but is at least partially transparent to visible wavelengths of light.

10. The system of claim 7 wherein the display and the camera are optically coupled to the edge by an optical coupler.

11. The system of claim 7 wherein the first and second portions do not abut in the second direction.

12. The system of claim 11 wherein the first and second portions abut in the second direction.

13. An apparatus comprising:

an eyepiece having a world-facing surface and an opposing eye-facing surface that extends in a first direction and an orthogonal second direction, the eyepiece comprising:

an angled surface extending at a non-zero angle between the world-facing surface to the eye-facing surface;

a first waveguide configured to transmit display light from a lateral edge of the eyepiece toward an eye of a user, the first waveguide extending in a first direction from a first portion of the angled surface to the lateral edge; and a second waveguide configured to transmit reflected eye-measurement light from the eye of the user to the lateral edge of the eyepiece, wherein the second waveguide extends in the first direction from a second portion of the angled surface to the lateral edge, and wherein the second portion of the angled surface is offset in the second direction from the first portion of the angled surface;

a display optically coupled to the first waveguide at the lateral edge; and a camera optically coupled to the second waveguide at the lateral edge, wherein the camera is configured to capture imagery representative of the reflected eye-measurement light concurrent with the display generating the display light.

14. The apparatus of claim 13, wherein the second portion abuts the first portion in the second direction.

15. The apparatus of claim 13, wherein the second portion is separated from the first portion by a gap in the second direction.

16. The apparatus of claim 13, wherein:

the first portion of the angled surface has a first surface treatment; and the second portion of the angled surface has a second surface treatment different than the first surface treatment.

17. The apparatus of claim 16, wherein:

the first surface treatment is partially reflective for visible light; and the second surface treatment is reflective for infrared light.

* * * * *